United States Patent [19]
Shields

[11] Patent Number: 5,940,418
[45] Date of Patent: *Aug. 17, 1999

[54] SOLID-STATE LASER SYSTEM FOR ULTRA-VIOLET MICRO-LITHOGRAPHY

[75] Inventor: Henry Shields, San Diego, Calif.

[73] Assignee: JMAR Technology Co., San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/755,166

[22] Filed: Nov. 22, 1996

Related U.S. Application Data

[63] Continuation-in-part of application No. 08/663,476, Jun. 13, 1996.

[51] Int. Cl.⁶ .......................................................... H01S 3/10
[52] U.S. Cl. ................................ 372/22; 372/23; 372/5; 372/20
[58] Field of Search ................................. 372/20, 22, 18, 372/23, 5; 359/330

[56] References Cited

U.S. PATENT DOCUMENTS

| | | | |
|---|---|---|---|
| 5,047,668 | 9/1991 | Bosenberg | 372/21 |
| 5,117,126 | 5/1992 | Geiger | 372/22 |
| 5,144,630 | 9/1992 | Lin | 372/22 |
| 5,274,650 | 12/1993 | Amano | 372/22 |
| 5,400,173 | 3/1995 | Komine | 372/21 |
| 5,477,378 | 12/1995 | Johnson | 372/22 |

FOREIGN PATENT DOCUMENTS

| | | |
|---|---|---|
| 7-170009 | 7/1995 | Japan . |
| 7-170010 | 7/1995 | Japan . |

OTHER PUBLICATIONS

Pixton, "Tripling yag frequency," *Laser Focus*, pp. 66–70 (Jul. 1978).

*Primary Examiner*—Leon Scott, Jr.
*Attorney, Agent, or Firm*—Baker & McKenzie

[57] ABSTRACT

A solid state laser systems for generating highly monochromatic laser radiation at wavelengths of interest for advanced micro-lithography, particularly 248 nanometer and 193 nanometer wavelengths. At least one Nd:YAG laser produces a 1,064 nm laser beam consisting of narrow-linewidth pulses of infra-red laser radiation having a pulse duration of less than 30 nanoseconds, at a pulse rate preferably in excess of 500 pulses per second with pulse energy greater than 20 millijoules. This radiation is frequency doubled and frequency tripled to produce 532 nm and 355 nm pulsed laser beams. These beams are then further optically processed to generate the ultra-violet wavelength for micro-lithography at either 248 nm or 193 nm.

51 Claims, 13 Drawing Sheets

5,940,418

SOLID-STATE LASER SYSTEM FOR ULTRA-VIOLET MICRO-LITHOGRAPHY

This is a Continuation-In-Part application of Ser. No. 08/663,476, filed Jun. 13, 1996. This invention relates to laser sources for illumination of photo-masks in the process of semiconductor micro-circuit fabrication by micro-lithography and in particular to 248 nanometer and 193 nanometer wavelength micro-lithography sources.

BACKGROUND OF THE INVENTION

Micro-Lithography

Semiconductor micro-circuits such as microprocessors, memory circuits and gate arrays are currently fabricated by the process of micro-lithography, in which microscopic patterns of conductors, semiconductors, and insulators are generated on a semiconductor wafer substrate, typically silicon. The master pattern is created, on an enlarged scale, on a photo-mask. This mask is illuminated by a very narrow band source of monochromatic light, and the pattern is optically transferred to the wafer surface via a high quality system of lenses and/or mirrors which accurately reproduce the pattern on the wafer on a reduced scale. In a well-designed optical system, the minimum feature dimension which can be resolved in the transferred pattern is determined by diffraction of the illuminating light source by the features on the mask. Traditionally, a mercury vapor discharge lamp has been used as the light source. The mercury g-line at 435 nanometers has been used in micro-lithography to achieve a pattern transfer resolution of 0.5 micrometers. More recently, micro-lithography systems have been built for the mercury i-line at 365 nanometers, allowing a resolution of 0.35 micrometers to be realized.

193 nm and 248 nm Micro-Lithography Excimer Laser Systems

The search for shorter wavelength sources has stimulated interest in excimer gas-discharge lasers as illumination sources for future micro-lithographic manufacturing. The krypton fluoride (KrF) excimer laser operates at 248 nanometers and is now being introduced in state-of-the-art micro-lithography systems, achieving a resolution of 0.25 micrometers. The argon fluoride (ArF) excimer laser, operating at 193 nanometers, is under development for next-generation micro-lithography systems providing a resolution of 0.18 micrometers. Integrated circuit fabricators are investing many millions of dollars in optical systems that are tied to these two wavelengths.

Disadvantages of Excimer Lasers

There are some significant disadvantages associated with the use of excimer gas lasers for micro-lithographic manufacturing. These include:

1. The laser source must provide highly monochromatic radiation to avoid blurring of the image pattern due to dispersion in the lenses of the optical system. The typical linewidth of excimer lasers is about 300 times too broad for good micro-lithography and special techniques must be used to achieved the required spectral purity. Practice has shown that this can only be achieved by substantially sacrificing laser power.

2. Excimer lasers require the use of halogen gas as an essential constituent of the lasing gas mixture. While this would normally be contained within the laser gas enclosure or gas supply bottles, a gas leak would represent both toxic and corrosive hazards in the manufacturing facility.

3. Excimer lasers are powered by a pulsed electrical discharge which, in the corrosive gas environment, results in electrode erosion and laser failure after approximately 2 billion pulses, which in turn results in increased operating costs.

4. This pulsed electrical discharge requires high voltages, typically in the 20–30 kilovolt range, resulting in generation of electromagnetic interference and posing an electrocution hazard to laser maintenance personnel.

5. Excimer lasers for micro-lithography typically generate light pulses of 10–20 millijoules energy, at repetition rates of 400–600 pulses per second. These laser parameters are known to result in inadequate control of laser exposure dose, and long-term radiation damage in optical materials.

Frequency Mixing

Laser systems for generating ultraviolet beams by non-linear frequency mixing have been proposed. For example Watanabe, et al, in 1991, proposed a cw system to produce radiation down to 190.8 nm by combining the second harmonic of an argon laser with a tunable Ti: Sapphire laser. The frequency of the argon beam is doubled using a $\beta$-$BaB_2O_4$ (BBO) crystal. (See Watnabe, et al, "Generation of Continuous-Wave Coherent Radiation Tunable Down to 190.8 nm in $\beta$-$BaB_2O_4$". Appl. Phys. B53,11–13 (1991)) A demonstration of the production of 193 nm beam using an excimer laser and a dye laser and a BBO crystal is discussed in Muckenheim, et al., Attaining the Wavelength Range 189–197 nm by Frequency Mixing in $\beta$-$BaB_2O_4$", Appl. Phys B 45, 259–261 (1988).

Frequency Multiplication

Crystals of $LiB_3O_5$ (LBO) have become available for efficient second harmonic ultraviolet generation. These crystals are discussed in the following two papers: Wu et al., "Highly efficient ultraviolet generation at 355 nm in $LiB_3O_5$", Optics Letters, vol. 14, No. 19, October 1989, pp 1080–1081 and Xie et al., "Characterization of $LiB_3O_5$ crystal for second-harmonic generation", Optics Letters, Vol.16, No. 16, August 1991, pp 1237–1239. A recent article in the May 1996 issue of Laser Focus World describes the frequency doubling with a BBO crystal of a 760 nm laser beam produced by an Alexandrite rod to produce a 380 nm ultra-violet beam.

Nd:YAG Lasers and Other Solid State Lasers

Nd:YAG lasers have been available for many years. For a general discussion of solid state laser devices, including Nd:YAG lasers, see: Koechner, "Solid State Laser Engineering", 4th edition, 1995, published Springer-Verlag. A recent paper by Hackel, et al proposes a diode pumped Nd:YAG laser for soft-x-ray projection lithography. (See: Hackel et al., "Laser driver for soft-x-ray projection lithography", Applied Optics, vol. 32, No. 34, December 1993, pp 6914–6919.) The scientific papers cited in this section are incorporated here by reference.

What is needed is a solid-state laser source for ultraviolet lithography, in order to avoid the problems associated with current excimer laser systems. Such a source could provide greater laser reliability and result in lower operating costs. In order to utilize the huge existing investment is optical imaging systems currently being provided, such a solid-state laser should generate laser light which is similar in wavelength, linewidth, and average laser power to the corresponding excimer lasers at 248 nanometers and 193 nanometers. Also, lower laser pulse energy and higher pulse repetition rate would be advantageous in controlling the dose of laser radiation delivered during a micro-lithography exposure, and in reducing the effects of long term ultraviolet radiation damage to optical materials used to make lenses and mirrors.

SUMMARY OF THE INVENTION

The present invention provides a solid state laser systems for generating highly monochromatic laser radiation at wavelengths of interest for advanced micro-lithography, particularly 248 nanometer and 193 nanometer wavelengths. At least one Nd:YAG laser produces a 1,064 nm laser beam consisting of narrow-linewidth pulses of infra-red laser radiation having a pulse duration of less than 30 nanoseconds, at a pulse rate preferably in excess of 500 pulses per second with pulse energy greater than 20 millijoules. This radiation is frequency doubled and frequency tripled to produce 532 nm and 355 nm pulsed laser beams. These beams are then further optically processed to generate the ultra-violet wavelength for micro-lithography at either 248 nm or 193 nm.

In a first preferred embodiment utilizing a single Nd:YAG laser, this further processing provides for utilizing a residual 532 nm pulsed beam to pump a titanium:sapphire laser to produce a pulsed beam at 828 nm. The 355 nm beam and the 828 nm beam are then combined using a dichroic mirror and directed to a beta-barium borate (BBO) crystal to produce a pulsed beam at 248 nm.

In a second preferred embodiment very similar to the first, the further processing involves utilizing the residual 532 nm beam to pump the titanium:sapphire laser to produce a beam at 710 nm. The laser pulses at 355 nm are combined with residual 1064 nm pulses in a LBO crystal to produce a 266 nm beam. The 710 nm beam and the 266 nm beam are then combined in a BBO crystal to produce a 193 nm pulse beam.

In other preferred embodiments two Nd: YAG lasers are utilized. In one the frequency is doubled and in the other the frequency is tripled. In these preferred embodiments, q-switches are controlled to assure pulse synchronization.

DETAILED DESCRIPTION OF PREFERRED EMBODIMENTS

Sum Frequency Generation

Figure 1:
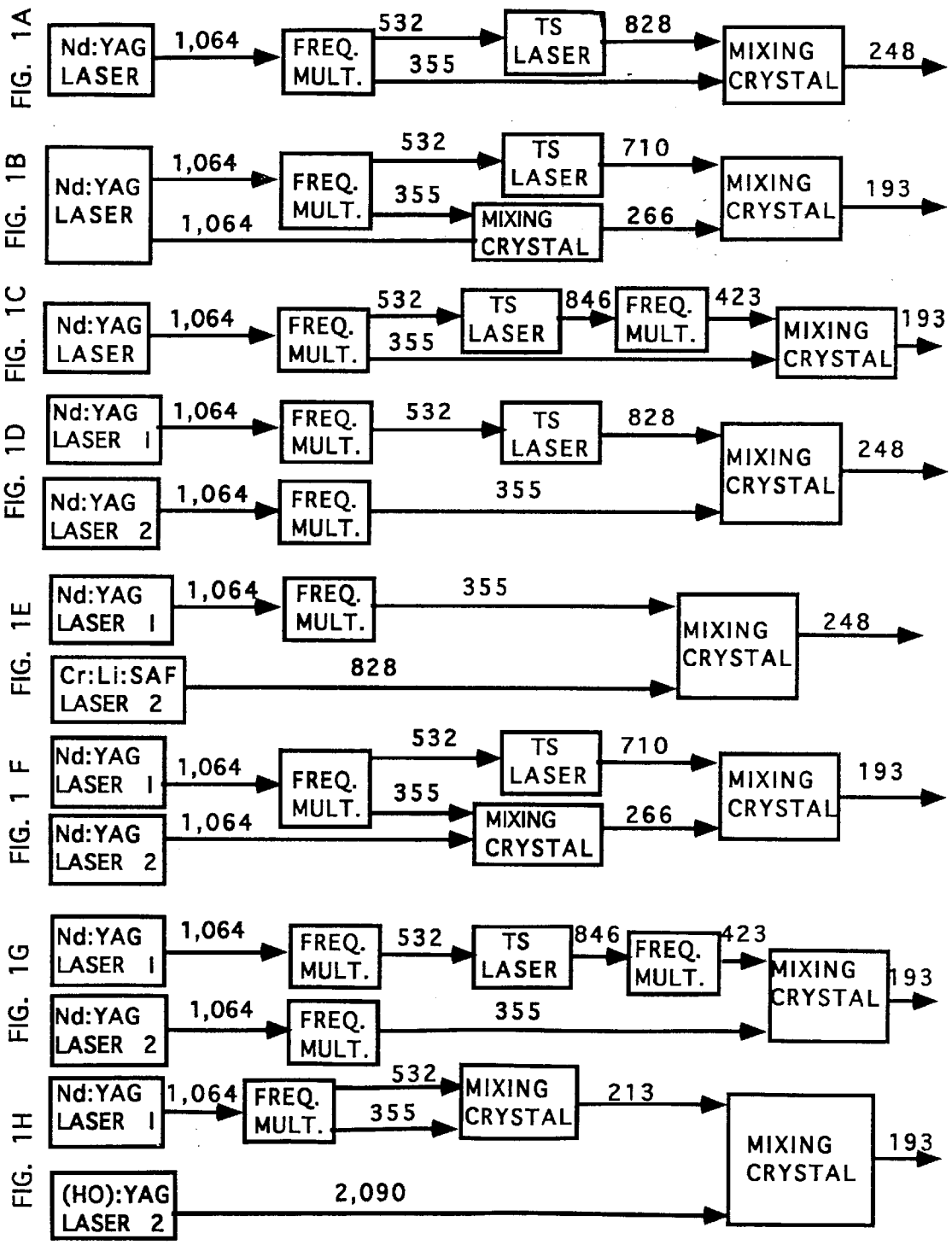
FIGS. 1A through 1H are a drawings showing the principal features of eight preferred embodiment of the present invention for generating narrow-line width ultra-violet laser radiation at wavelengths appropriate for micro-lithography.

The process of sum-frequency generation allows a shorter wavelength laser beam to be generated by mixing laser pulses from two longer wavelength laser sources in a non-linear crystal in an approximately collinear beam. In particular, this crystal has different indices of fraction along the three orthogonal crystal axes, i.e. it is birefringent. The process results in generation of a shorter output wavelength $\lambda 3$, from the longer input wavelengths $\lambda 1$ and $\lambda 2$, according to conservation of photon energy.

$$\frac{1}{\lambda 3} = \frac{1}{\lambda 1} + \frac{1}{\lambda 2}$$

For example, sum-frequency generation of two laser pulses at $\lambda 1 = 355$ nm and $\lambda 2 = 828$ nm results in a wavelength of $\lambda 3 = 248$ nm.

This process will only occur with an efficiency of practical interest if the conservation of photon momentum equation is satisfied over the length of the crystal, typically 10 to 20 mm. This equation may be written in the form:

$$\frac{n(\lambda 3, \theta)}{\lambda 3} = \frac{n(\lambda 1, \theta)}{\lambda 1} + \frac{n(\lambda 2, \theta)}{\lambda 2}$$

where $n(\lambda, \theta)$ is the refractive index of the crystal and its value depends on the wavelength $\lambda$, the angle of propagation $\theta$ relative to a principal crystal axis (the optic axis), and the polarization of the laser radiation. Specific solutions to the energy and momentum conservation equations for selected laser wavelengths result in a phase-matching angle, $\theta$, characteristic of the birefringent crystal, such as potassium dihyrogen phosphate (KDP) and isomorphs, potassium titanyl phosphate (KTP), beta-barium borate (BBO), lithium borate (LBO), etc. Equations to calculate phase matching angles for these crystals, at various laser wavelengths, are discussed in detail in the Handbook of Nonlinear Optical Crystals, by Dmitriev, Gurzadyan and Nikogoysan (Springer-Verlag, 1991).

There is a broad range of wavelengths $\lambda 1$ and $\lambda 2$ which may be summed to generate $\lambda 3$ at 248 or 193 nm, which are wavelengths of importance for semiconductor micro-circuit fabrication by optical micro-lithography, and many solutions to the energy and momentum conservation equations may be found for known nonlinear crystals. However, only solutions of practical importance are where $\lambda 1$ and $\lambda 2$ correspond to wavelengths of efficient, high power lasers which can be produced with available technology such as the 1064 nm Nd:YAG wavelength.

Further constraints, for efficient sum-frequency generation are:

(1) the laser pulses at wavelengths $\lambda 1$ and $\lambda 2$ should have similar temporal shape;

(2) the laser pulses at wavelengths λ1 and λ2 should have similar spatial shape: and (3) the number of photons at each wavelength should be approximately equal, and since the number of photons in a laser pulse is proportional to the product of the pulse energy E and the wavelength λ, this may be stated as:

E1λ1=E2λ2

First Nd:YAG Source

Figure 2:
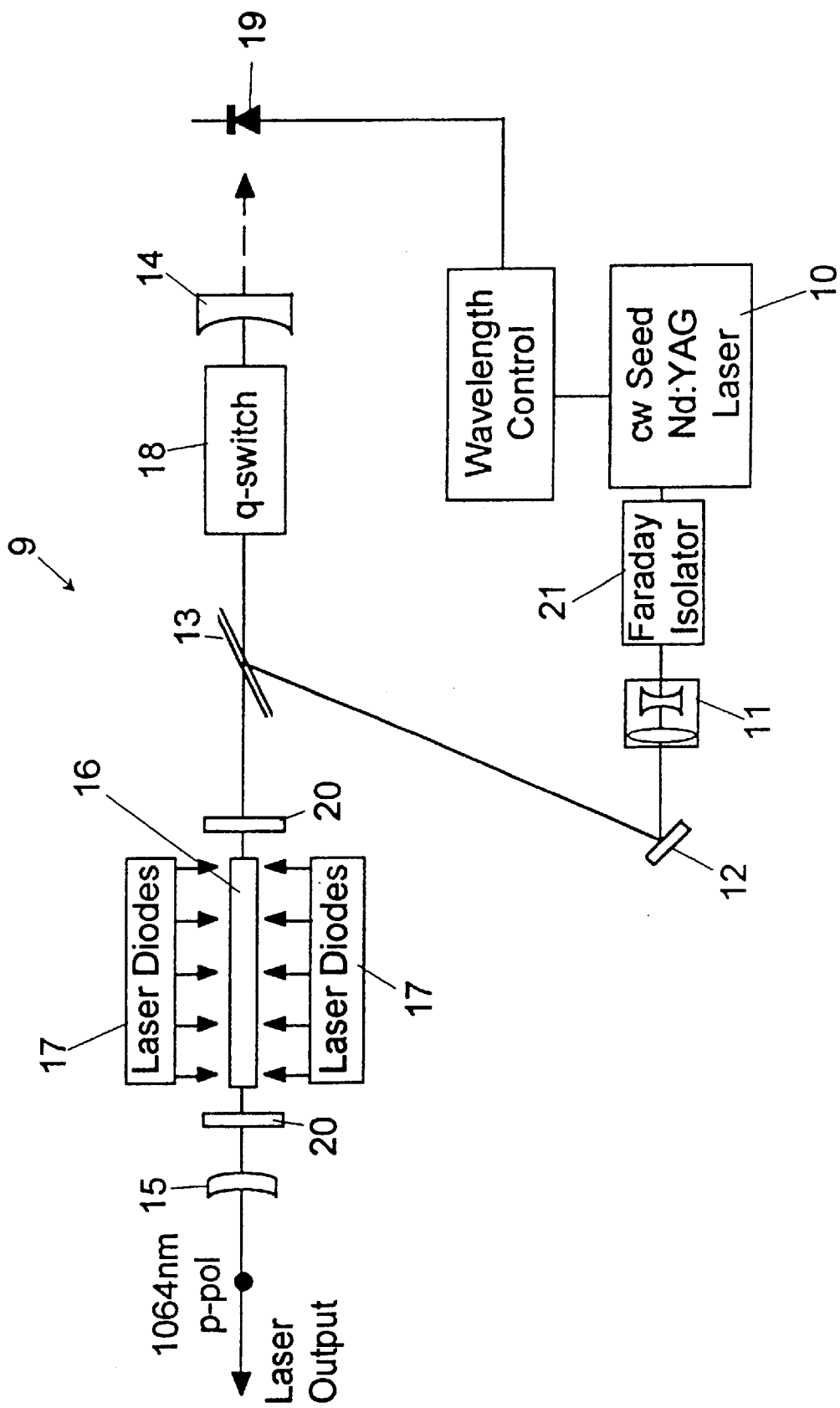
FIG. 2 is a drawing showing a first preferred Nd:YAG laser system configuration.

A preferred Nd:YAG laser system is described in FIG. 2. The system consists of a q-switched, diode-pumped Nd:YAG laser oscillator, which provides laser pulses of 5 to 30 nanoseconds in duration, at a wavelength of 1064 nanometers. The laser pulse energy is approximately 100 millijoules per pulse at a pulse repetition rate of 1000 pulses per second. This laser operates on a single longitudinal mode of the laser resonator, by means of the technique of injection-locking to a continuous-wave (cw) ring-resonator Nd:YAG source laser, as discussed in the text by Koechner. This results in a very narrow laser linewidth of less than 0.001 nanometers.

The cw seed laser 10 is a small monolithic ring Nd:YAG laser which operates on a single longitudinal mode of the laser resonator, resulting in a very narrow laser linewidth. The output of this laser is continuously injected into the resonator of a power oscillator Nd:YAG laser by means of a beam expanding telescope 11, mirror 12 and polarizer 13. The power oscillator resonator is defined by a highly reflecting mirror 14 and a partially transmitting output mirror 15. It includes a polished Nd:YAG laser rod 16 (6.3 millimeters diameter×80 millimeters long) pumped by an array of laser diodes 17 providing 300 W of average pump power at a wavelength of 808 nanometers, and a duty factor of 20% (200 microseconds ON, 800 microseconds OFF). An electro-optic Pockels cell 18 is used as a q-switch to change the polarization state of the power oscillator resonator. When the gain in the Nd:YAG rod has reach a peak, a voltage pulse is applied to the q-switch to change the resonator loss from a high value to a low value, and this allows the power oscillator pulse to build from the narrow linewidth input of the injected laser beam. The build-up time of the power oscillator pulse is detected from weak laser output leaking through the highly reflecting resonator mirror 14, by means of photo diode 19. This build-up signal is used to adjust the seed wavelength to match the nearest longitudinal mode of the power oscillator resonator. Quarter-wave polarization retardation plates 20 are positioned at each end of the laser rod to provide circularly polarized radiation, and spatially-uniform laser gain, in the rod. A Faraday effect optical isolator 21 is used to prevent leakage from the polarizer in the power oscillator returning to the cw seed laser. A complete cw seed laser system, including diode-pumped ring oscillator, wavelength control, Faraday isolator, and beam-expanding telescope, is commercially available from Lightwave Electronics, with offices in Mountain View, Calif. (Series 101).

Second Nd:YAG Laser Source

Figure 3:
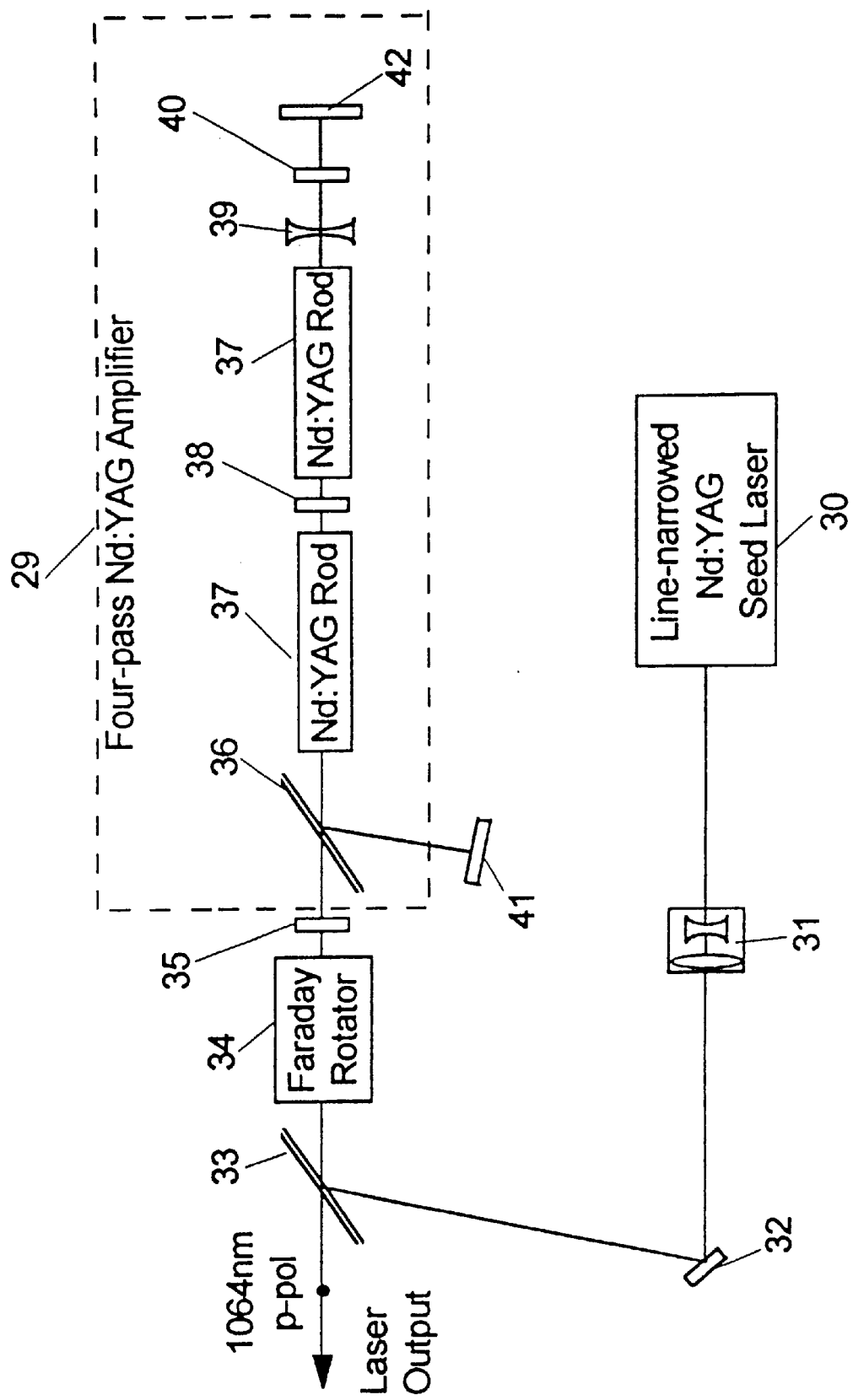
FIG. 3 is a drawing showing the details of a second preferred Nd:YAG laser system configuration.

A second preferred Nd:YAG laser system can be described by reference to FIG. 3. The system utilizes a line-narrowed seed laser followed by a four-pass amplifier. The output characteristics of this embodiment are similar to that of the first preferred embodiment; 100 millijoules per pulse at a rate of 1000 pulses per second, a pulse duration in the range from 5 to 30 nanoseconds, a wavelength of 1064 nanometers, and a linewidth of 0.001 nanometers. The line-narrowed seed laser 30 is a small q-switched laser, injection-locked to a cw ring laser, as discussed in the first preferred embodiment. The laser output pulse energy is about 1 millijoules at 1000 pulses per second. Such a seed laser source is commercially available from Continuum, Inc. with offices in Santa Clara, Calif. (model HPO-1000).

The output beam from the pulsed seed laser is s-polarized and is expanded by the beam-expanding telescope 31 from a diameter of 0.8 millimeters to a diameter of 6 millimeters. It is directed to the amplifier 29 by mirror 32 and reflection off polarizer 33. The plane of polarization is rotated through 45 degrees by Faraday rotator 34 and then a further 45 degrees to p-polarization by the half-wave plate 35. The pulsed beam passes through polarizer 36 and into the Nd:YAG rod laser amplifier 29. The two rods 37 are 6.3 millimeters in diameter and 80 millimeters long, pumped by laser diode arrays at a wavelength of 808 nanometers. A 90 degree polarization rotator 38 is placed between the rods and the rod axes are aligned according to established practice to compensate for stress-induced depolarization of the beam. Negative lens 39 is used to compensate for the positive lens effect due to thermal gradients in the Nd:YAG rods. The beam passes through quarter-wave plate 40 before and after reflection at mirror 42 to result in a net polarization rotation to s-polarization on the second pass backwards through the rods. The beam is thus reflected at polarizer 36 and by mirror 41 such that, on the third and fourth passes, the process is repeated. After the fourth pass, the polarization is now in the p-orientation at polarizer 36, and the beam exits the amplifier. In this case, the polarization rotation due to half-wave plate 35 and Faraday rotator 34 cancel, and the p-polarized, amplified beam is transmitted out through polarizer 33. The beam is p-polarized at 1064 nm, and preferably the pulses are about 10 ns in duration with a repetition rate of 1000 pulses per second and an energy per pulse of about 100 millijoules.

Conversion from 1064 nm to 355 nm

Figure 4:
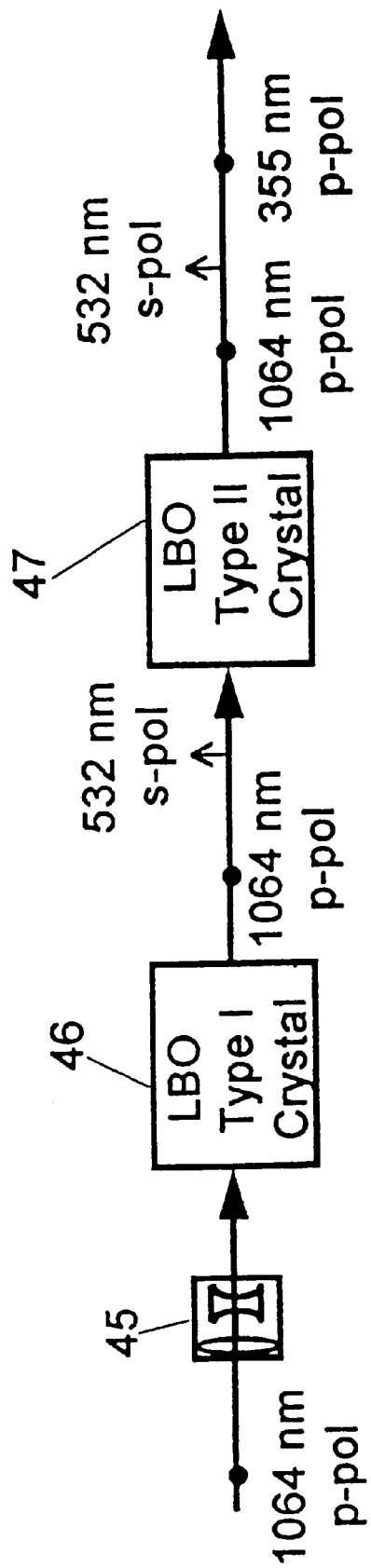
FIG. 4 is a drawing showing the details of a preferred means of wavelength conversion to generate a beam with wavelengths of 1064, 532 and 355 nm.

The primary laser beam at 1064 nanometers is converted to intermediate laser beams at 532 nanometers and 355 nanometers, using the preferred embodiment shown in FIG. 4. Pulses of linearly polarized 1064 nanometer laser radiation, having an energy of 100 millijoules are reduced in beam diameter from 6 millimeters to 1.5 millimeters, by means of the Galilean telescope 45. These pulses are directed at a peak intensity of 500 MW/cm2 to a Second Harmonic Crystal 46. This is a LBO crystal measuring 12 millimeters in length and is cut with its crystal axis oriented to provide efficient phase-matched conversion from p-polarized 1064 nanometers to s-polarized 532 nanometers (Type I phase matching), as described by Xie et al. For a 1064 nanometers pump energy of 100 millijoules, approximately 50 millijoules will be converted to 532 nanometers. The orthogonally-polarized 1064 nanometers and the s-polarized 532 nanometers beams are then directed to a Third Harmonic Crystal 47, also made from LBO. This crystal is 12 millimeters in length and is cut with its crystal axis oriented to provide efficient phase-matched mixing of p-polarized 1064 nanometers and s-polarized 532 nanometers laser pulses to a wavelength of 355 nanometers (Type II phase matching), as described by Wu et al. The energy in the p-polarized 355 nanometers beam is approximately 25 millijoules, with about 33 millijoules remaining at 532 nanometers. The residual energy at 1064 nm is 42 millijoules.

PREFERRED EMBODIMENTS

Preferred embodiments of the present invention can be described by reference to FIGS. 1A through 1H, and FIGS.

5 through 12. Eight such preferred embodiments of the present invention for producing laser beams at wavelengths useful for micro-lithography are described in detail herein. These eight embodiments are presented in summary form in FIGS. 1A through 1H. These embodiments all utilize currently available solid state electronics and high power efficient laser sources such as the Nd:YAG laser.

First Preferred Embodiment—Conversion to 248 nm

Figure 5:
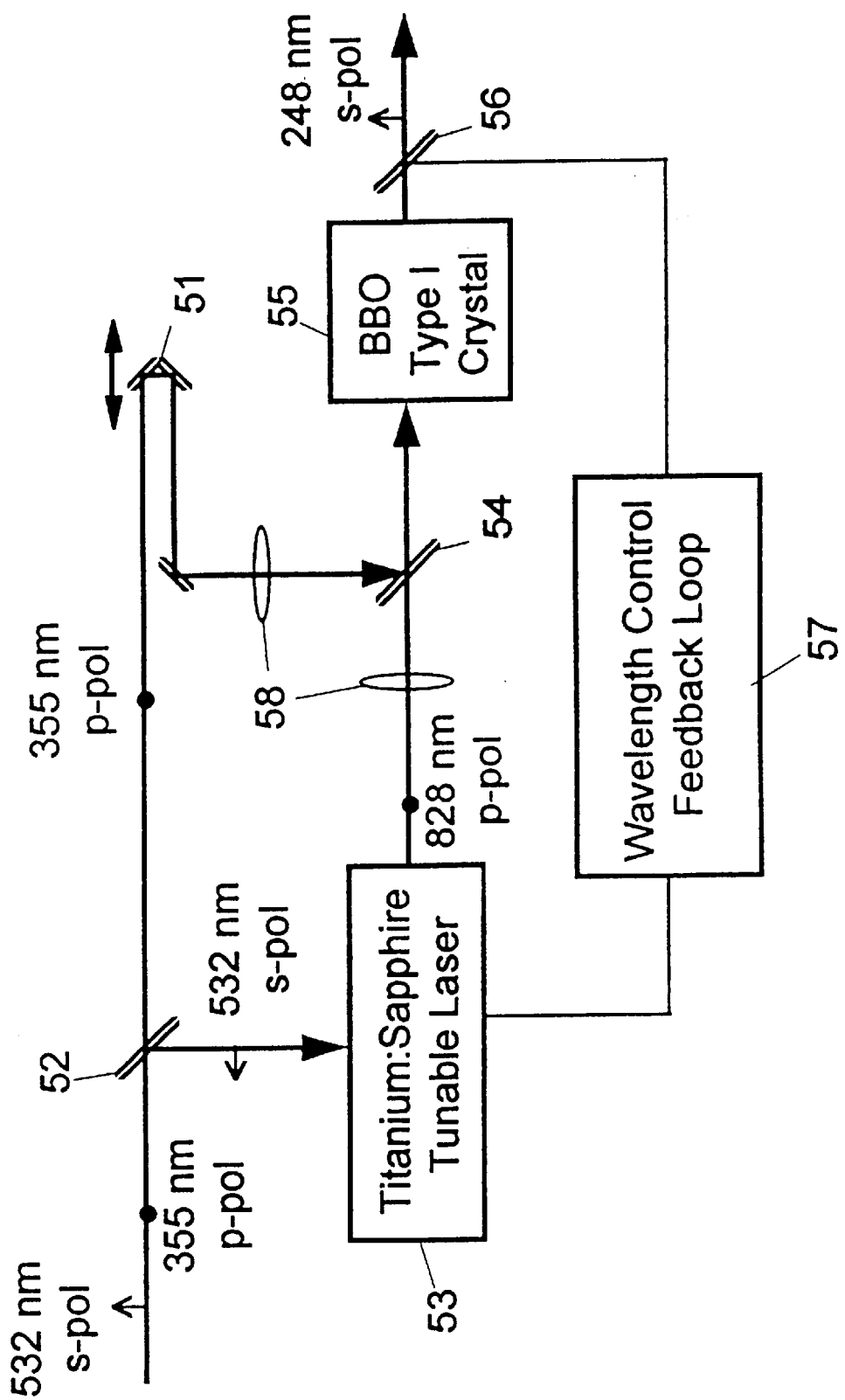
FIG. 5 is a drawing showing the details of a preferred means of wavelength conversion to generate a final wavelength of 248 nanometers in the ultra-violet.

A first preferred embodiment to convert the 532 and 355 nanometer laser beams to 248 nanometers is described in FIG. 5. The s-polarized 532 nanometers beam is separated by dichroic beamsplitter 52 and used to pump a Titanium:sapphire laser 53. The Titanium:sapphire laser is tunable from 700 to 900 nanometers by means of a diffraction grating which also provide spectral narrowing of the output laser radiation to about 0.05 nanometers. Additional line-narrowing to 0.01 nanometers is achieved by inserting an etalon in the laser resonator. In this preferred embodiment, the Titanium:sapphire laser output is 10 millijoules per pulse at a wavelength of 828 nanometers, with p-polarization. A suitable Titanium:sapphire laser is commercially available from Photon Industries International Inc. (model TU-IR) with offices in Stoney Brook, N.Y.

This embodiment generates laser pulses at 355 nanometers and 828 nanometers wavelengths having the same p-polarization orientation. These pulses are made to overlap in space and time in a Wavelength Mixing Crystal 55 to result in generation of a shorter wavelength at 248 nanometers, by means of the process of sum-frequency generation. This crystal is made from Beta-Barium Borate (BBO) (Type I phase matching), and is 8 millimeters in length. Temporal coincidence of the laser pulses is achieved by introducing a propagation time delay in the 355 nanometer laser beam, by means of a roof prism 51. The position of this prism is adjusted so that the 355 and 828 nanometer laser pulses pass simultaneously through the crystal. Spatial overlap results from combining the beams at the dichroic mirror 54, which transmits the 828 nanometer beam and reflects the 355 nm beam. Lenses 58 are provided to increase the intensity of pulses in the BBO crystal to maximize the generation of 248 nanometer output. The resulting laser pulses at 248 nanometers have an energy of 10 millijoules, a pulse rate of 1000 Hz, a linewidth of 0.001 nanometers, and a pulse duration in the range from 5 to 30 nanoseconds. Stabilization of the output wavelength at the value required for micro-lithography is achieved by sampling a small fraction of the output pulse energy using a beam sampling partial reflector 56. The wavelength is compared against a reference value using a Fabry-Perot etalon, and any required correction is accomplished by fine adjustment of the titanium:sapphire laser tuning elements (diffraction grating and/or narrow-line etalon), by means of the feedback loop 57.

Second Preferred Embodiment—Conversion to 193 nm

Figure 6:
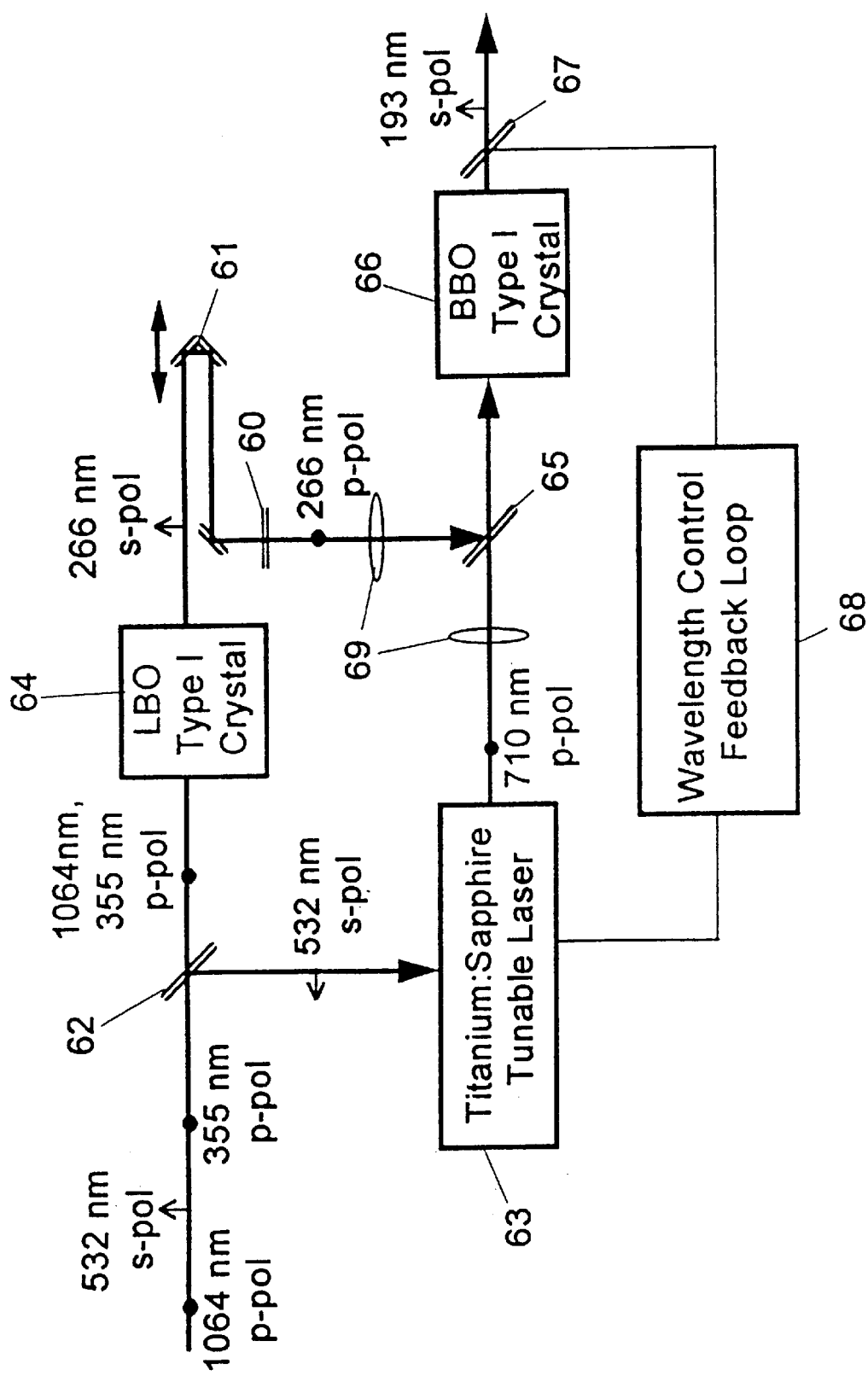
FIG. 6 is a drawing showing the details of a first preferred means of wavelength conversion to generate a final wavelength of 193 nm.

A second preferred embodiment to generate a laser beam at 193 nanometers is shown in FIG. 6. The harmonic conversion system of FIG. 4. is used to generate pulses of linearly polarized laser radiation at 1064, 532 and 355 nanometers at the pulse energy levels discussed previously. The 532 nanometers laser beam is separated by a dichroic beamsplitter 62 and used to pump the titanium:sapphire laser 63, as in the previous embodiment. In this first preferred embodiment for conversion to 193 nanometers, the Titanium:sapphire laser is tuned to a wavelength of approximately 710 nanometers and the output energy is about 5 millijoules per pulse. The laser pulses at 355 nanometers and the residual pulses at 1064 nanometers are of the same p-polarization and are converted to s-polarized 266 nanometers by a Fourth Harmonic Crystal 64 (Type I phase matching). This is a LBO crystal having a length of 15 millimeters. The energy of the 266 nanometers pulses is about 13 millijoules. The polarization of the 266 nanometer beam is rotated to p-polarization by means of a half-wave retardation plate 60.

The pulses at 266 and 710 nanometer wavelengths are made to overlap in space and time in the wavelength mixing crystal 66 to result in generation of a shorter wavelength at 193 nanometers, by means of the process of sum-frequency generation. This crystal is made from BBO (Type I phase matching), and is 8 millimeters in length. Temporal overlap is provided by adjustment of the propagation delay by roof prism 61, and spatial overlap results from combining beams at the dichroic mirror 65. Lenses 69 increase the laser beam intensity in the crystal to maximize output at 193 nanometers. The resulting laser pulses at 193 nanometers have an energy of 5 millijoules, a pulse rate of 1000 Hz, a linewidth of 0.001 nanometers, and a pulse duration in the range from 5 to 30 nanoseconds. Stabilization of the output wavelength at the value required for micro-lithography is achieved by using the beam sampling partial reflector 67 and feedback loop 68, as before.

Third Embodiment—Conversion to 193 nm

Figure 7:
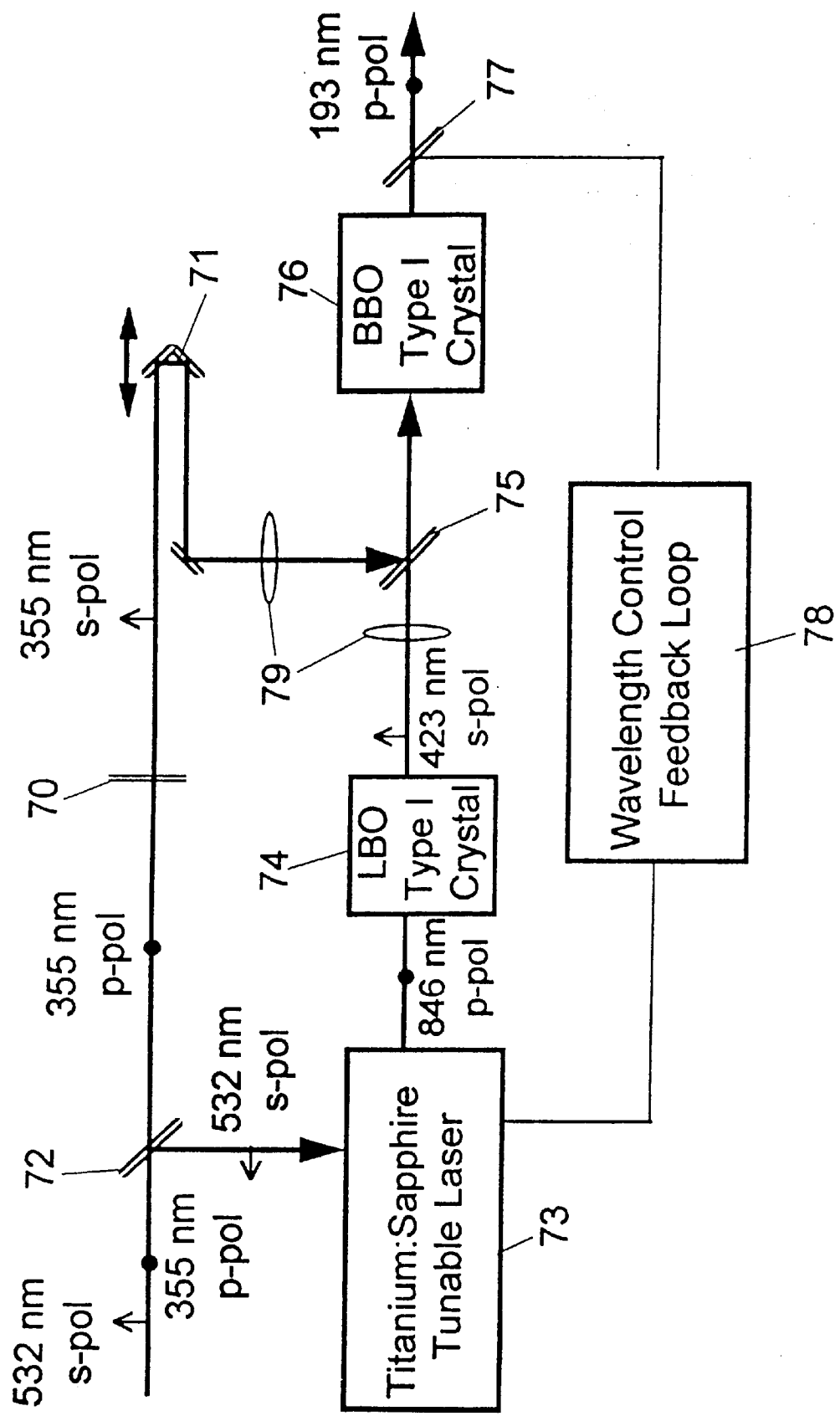
FIG. 7. is a drawing showing the details of a second preferred method of wavelength conversion to 193 nm.

A third preferred embodiment to generate a laser beam at 193 nanometers is shown in FIG. 7. The harmonic conversion system of FIG. 4. is used to generate pulses of linearly polarized laser radiation at 1064, 532 and 355 nanometers at the pulse energy levels discussed previously. The 532 nanometers laser beam is separated by a dichroic beamsplitter 72 and used to pump the titanium:sapphire laser 73, as in the previous embodiment. In this second preferred embodiment for conversion to 193 nanometers, the Titanium:sapphire laser is tuned to a wavelength of approximately 846 nanometers and the output energy is about 11 millijoules per pulse. The titanium:sapphire laser output is converted to a wavelength of 423 nanometers by a second harmonic crystal 74 (Type I phase matching). This is a LBO crystal having a length of 12 millimeters. The energy of the 423 nanometers pulses is about 6 millijoules, and the beam is s-polarized.

This embodiment generates s-polarized laser beams at 355 nanometers and 423 nanometers wavelengths and these beams are combined at dichroic mirror 75 to provide spatial overlap in the wavelength mixing crystal 76 to result in generation of a shorter wavelength at 193 nanometers, by means of the process of sum-frequency generation. This crystal is made from BBO (Type I phase matching), and is 8 millimeters in length. Temporal overlap is achieved by adjusting the propagation delay of the 355 nanometer beam in the roof prism arm 71. The resulting laser pulses at 193 nanometers have an energy of 4 millijoules, a pulse rate of 1000 Hz, a linewidth of 0.001 nanometers, and a pulse duration in the range from 5 to 30 nanoseconds. Stabilization of the output wavelength at the value required for micro-lithography is achieved by using the beam sampling partial reflector 77 and feedback loop 78, as before.

Fourth Preferred Embodiment—Conversion to 248 nm

Figure 8:
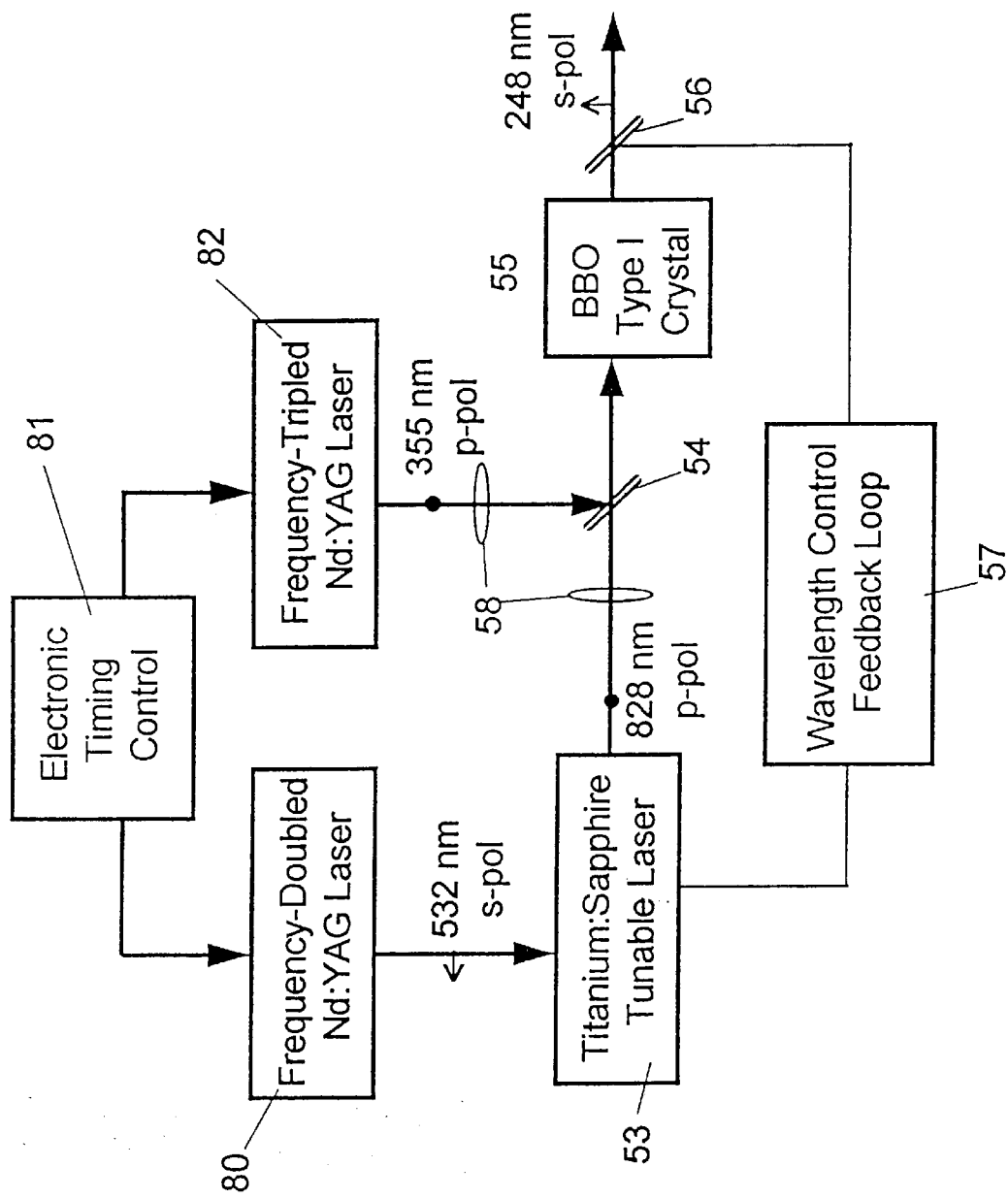
FIG. 8 is a drawing showing a preferred embodiment for generating 248 nm using two Nd:YAG lasers.

The first preferred embodiment for generation of 248 nm laser radiation shows the use of a variable optical delay provide by a roof prism, identified as 51 in FIG. 5. This variable delay is adjusted to insure that input laser pulses (at 828 nm and 355 nm) to wavelength mixing BBO Type I crystal 55 arrive in synchronization. The time difference between these pulses is mainly due to the 828 nm laser pulse build-up time in Titanium:sapphire laser 53 and is typically about 100 nanoseconds. This corresponds to an optical delay path of about 30 meters for the 355 nm laser pulse. For situations where the optical path length is too long to be practical, such as in compact equipment, an alternate embodiment is shown in FIG. 8.

In this embodiment, two Nd:YAG lasers are used. The first 80 is a frequency-doubled laser with an output of about 33 millijoules per pulse at 532 nm. This laser pumps the Titanium:sapphire laser 53 to generate laser pulses of about 10 millijoules at 828 nm. The second 82 is a frequency-tripled laser with an output of about 25 millijoules at 355 nm. These Nd:YAG lasers are q-switched, diode pumped laser oscillators, and are injection-locked to achieve narrow laser line width using techniques described in FIGS. 2 and 3. Temporal synchronization of the 828 nm and the 355 nm laser pulses is achieved in this embodiment by electronic control of the time at which the electro-optic Pockels cell q-switch is triggered in each laser oscillator using electronic timing control 81. Typically, synchronization can be achieved to better than plus or minus 2 nanoseconds using commercially available electronic pulse delay generators such as Model DG535 supplied by Stanford Research Systems (Sunnyvale, Calif.). Combining the 828 nm beam with the 355 nm beam in BBO Type I crystal 55 produces the 248 nm output.

Fifth Preferred Embodiment—Conversion to 248 nm

Figure 13:
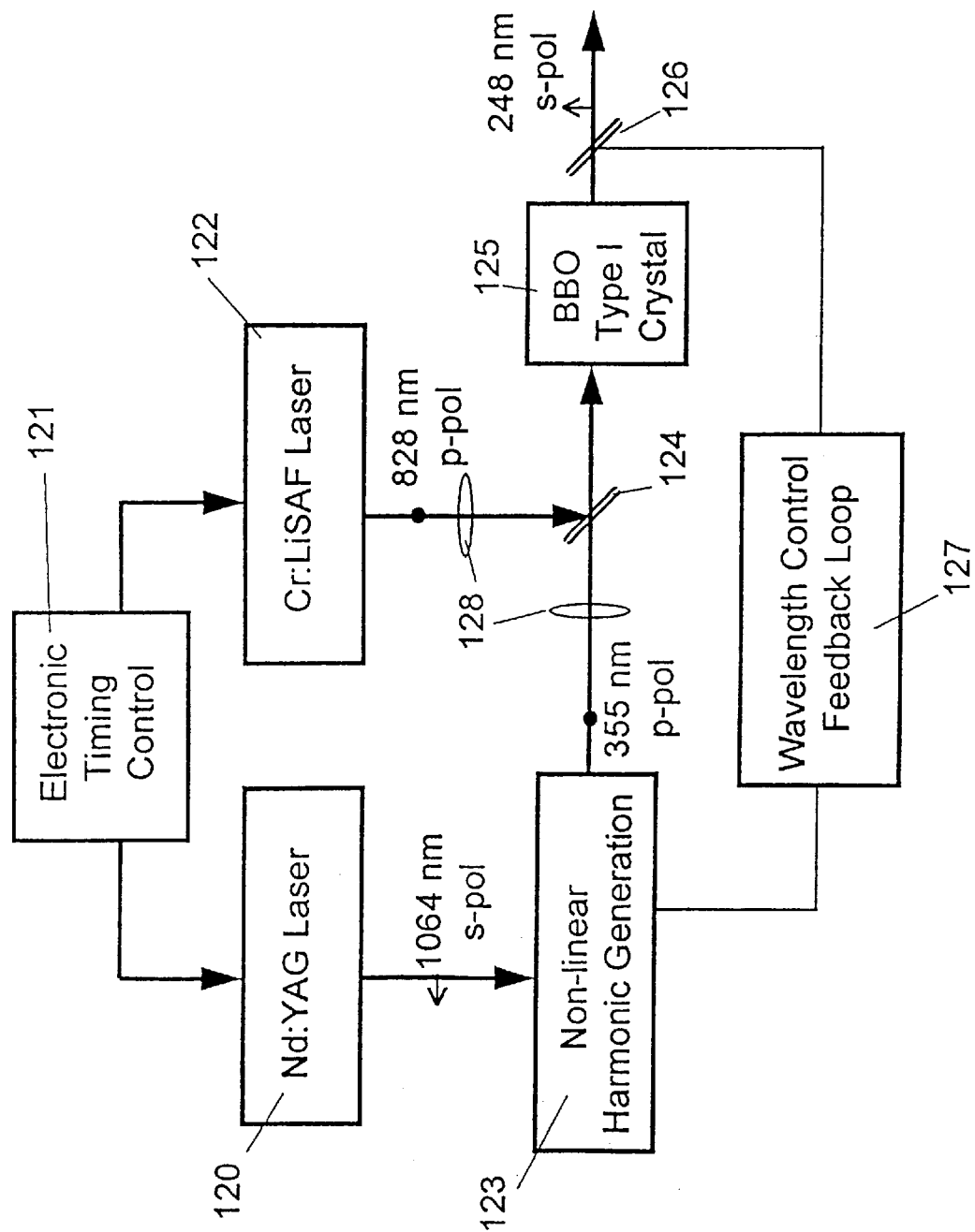
FIG. 13 is a drawing showing a method of generating 248 nm using a Nd:YAG laser and a Cr:LiSAF laser.

A fifth preferred embodiment for generation of 248 nm laser pulses is shown in FIG. 13. this embodiment uses a q-switched, diode-pumped Nd:YAG; laser oscillator, 120 to generate laser pulses at 1064 nm having a pulse energy of 100 millijoules and a pulse rate of 1000 pulses per second. This laser output is converted to pulses at a wavelength of 355 nm (the third harmonic of the 1064 nm primary laser beam) by the established process of harmonic generation in non-linear crystal 123. Laser radiation at the wavelength of 355 nm is generated from the 1064 nm laser beam using LBO crystals as described above with reference to FIG. 4. The laser pulses at 355 nm have p-polarization and an energy per pulse of approximately 25 millijoules at 100 pulses per second.

A second laser source 122 provides laser output at a wavelength of 828 nm. This is a diode-pumped Cr:LiSAF (chromium-doped lithium-strontium-aluminum fluoride) laser, such as described by Scheps and co-workers in Optics Letters, volume 16, pages 820–822 and is q-switched to provide a pulsed output of approximately 10 millijoules per pulse at 1000 pulses per second. The p-polarized laser pulses at 355 nm and 828 nm are combined at the dichroic mirror 124 to overlap in space and time. Temporal synchronization is achieved by electronic control of the trigger pulses applied to the primary laser q-switches using electronic timing control 121. These pulses enter waveguide mixing crystal 125 which is a BBO crystal of about 10 mm in length oriented for Type I phase matching. The resulting laser pulses at the shorter sum-frequency wavelength of 248 nm have an energy of about 10 millijoules and a pulse rate of 1000 pulses per second.

Sixth Preferred Embodiment—Conversion to 193 nm

Figure 9:
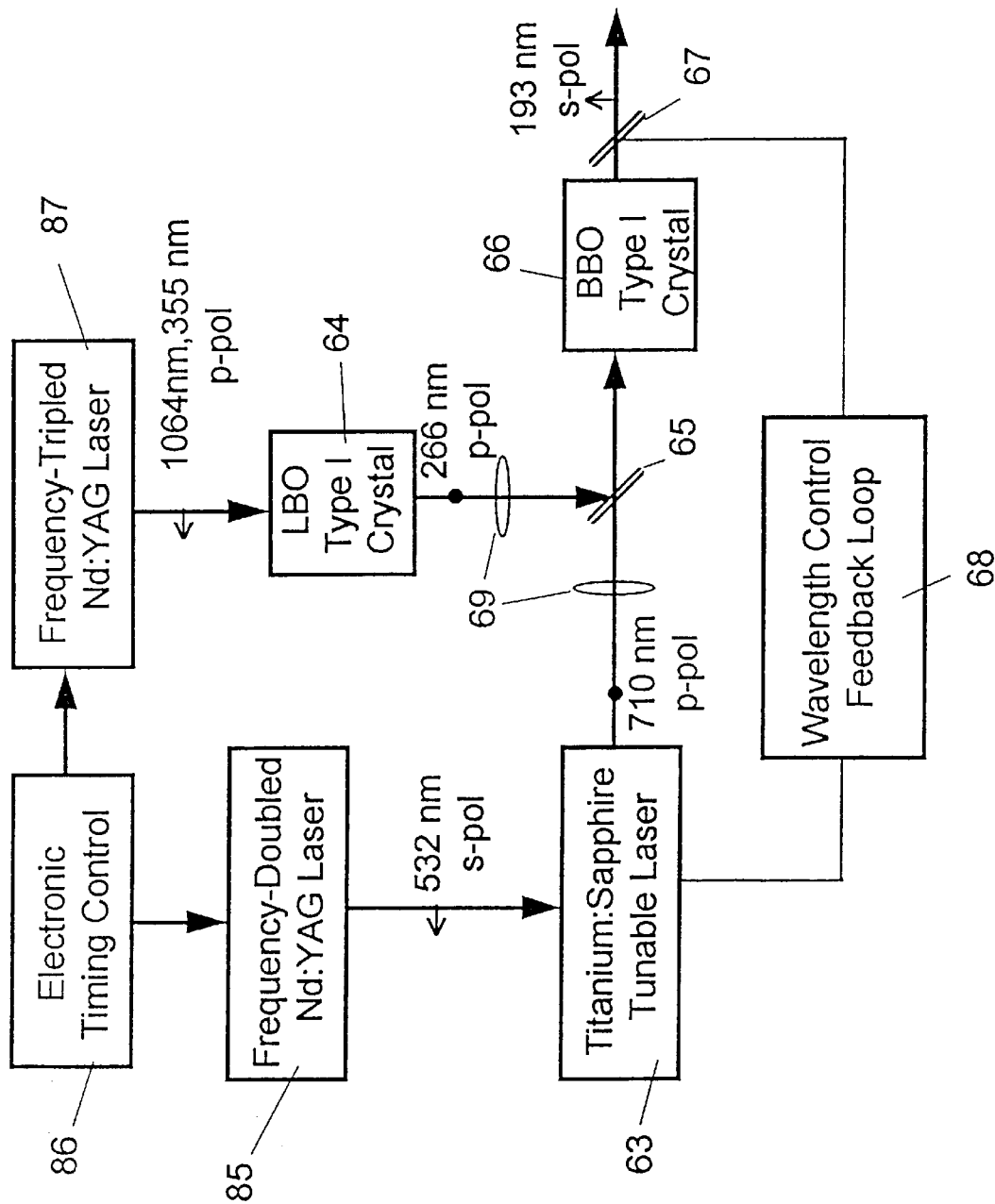
FIG. 9 is a drawing showing a preferred embodiment for generating 193 nm using two Nd:YAG lasers.

A sixth preferred embodiment is shown in FIG. 9 in which two Nd:YAG lasers are used. The first laser 85 is a frequency-doubled laser with an output of about 33 millijoules per pulse at 532 nm. This laser pumps titanium:sapphire laser 63 to generate laser pulses of about 5 millijoules at 710 nm. The second Nd:YAG laser 87 generates a fundamental wavelength of 1064 nm and the third harmonic of 355 both of which are mixed in LBO crystal 64 to generate and output of about 13 millijoules at 266 nm. These Nd:YAG lasers are q-switched, diode-pumped laser oscillators and are injection-locked to achieve narrow laser linewidth using techniques described above with respect to FIGS. 2 and 3. Temporal synchronization of the 710 nm and the 266 nm laser pulses is achieved by electronic control of the time at which electro-optic Pockels cell q-switch is triggered in each laser oscillator using electric timing control unit 86. Typically synchronization can be achieved to better than plus or minus 2 nanoseconds using commercially available electronic pulse delay generators such as model DG 535 supplied by Stanford Research Systems (Sunnyvale, Calif.).

Seventh Preferred Embodiment—Conversion to 193 nm

Figure 10:
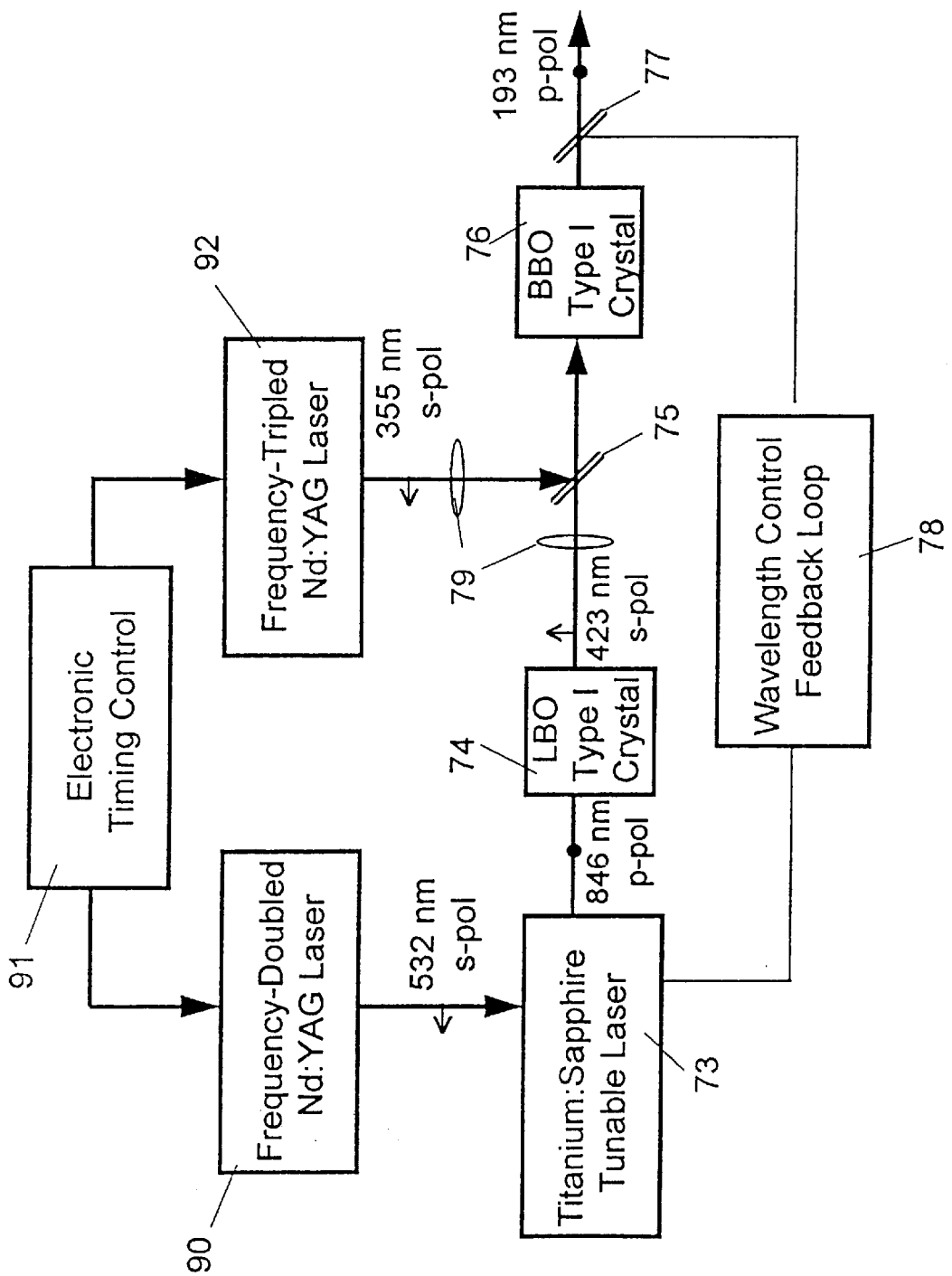
FIG. 10 is a drawing showing a second preferred embodiment for generating 248 nm using two Nd:YAG lasers.

A seventh preferred embodiment is shown in FIG. 10 in which two Nd:YAG lasers are used. The first laser 90 is a frequency-doubled laser with an output of about 33 millijoules per pulse at 532 nm. This laser pumps titanium:sapphire laser 73 to generate laser pulses which are frequency doubled by LBO crystal 74 to produce pulses of about 6 millijoules at 423 nm. The second Nd:YAG laser 92 generates a fundamental wavelength of 1064 nm which is frequency tripled to 355 nm at about 8 millijoules. These Nd:YAG lasers are q-switched, diode-pumped laser oscillators and are injection-locked to achieve narrow laser linewidth using techniques described above with respect to FIGS. 2 and 3. The 423 nm beam is mixed with the 355 nm beam to produce a 193 nm beam in BBO crystal 76. Temporal synchronization of the 423 nm and the 355 nm laser pulses is achieved by electronic control of the time at which electro-optic Pockels cell q-switch is triggered in each laser oscillator using electric timing control unit 91. As described above, synchronization can be achieved to better than plus or minus 2 nanoseconds using commercially available electronic pulse delay generators such as model DG 535 supplied by Stanford Research Systems (Sunnyvale, Calif.).

Eighth Preferred Embodiment—Conversion to 193 nm

Figure 11:
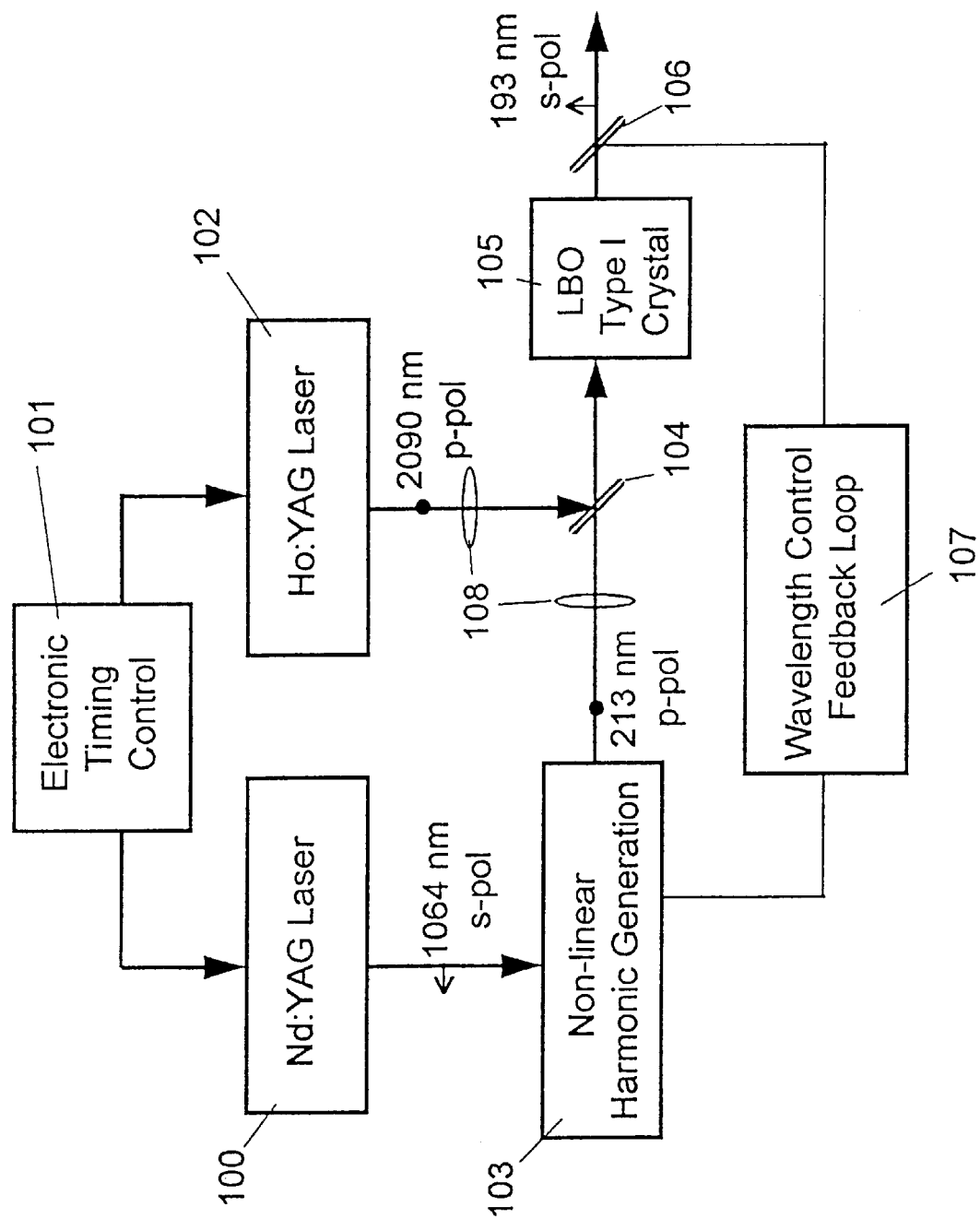
FIG. 11 is a drawing showing a preferred embodiment for generating 248 nm using a Nd:YAG laser and a Ho:YAG laser.
Figure 12:
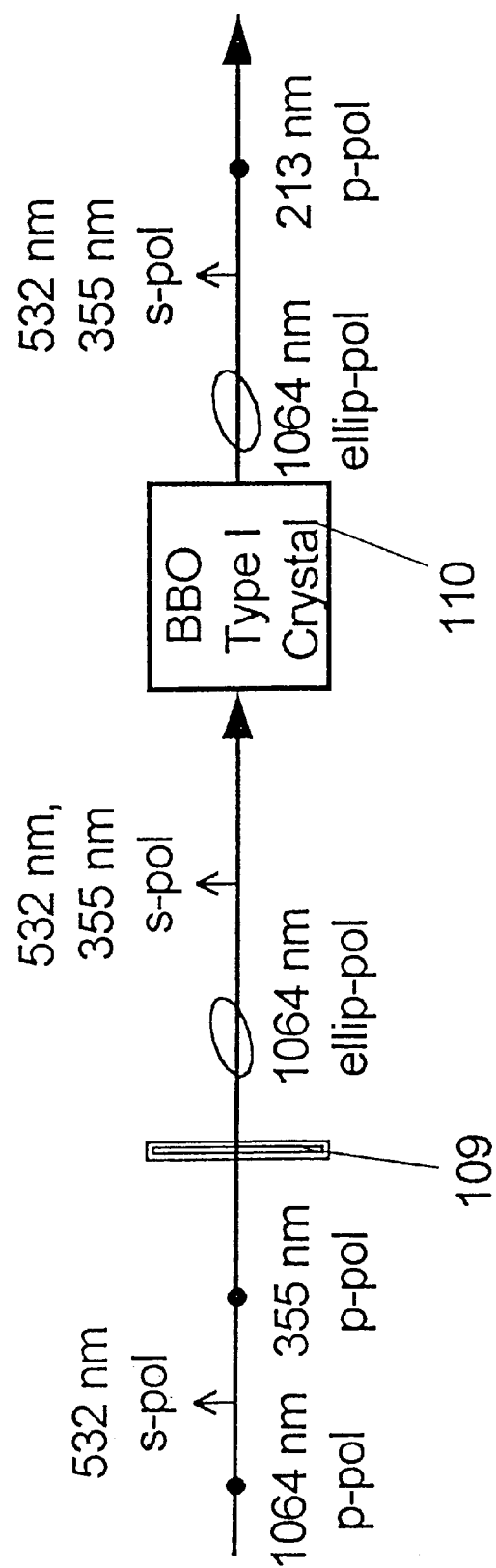
FIG. 12 is a drawing showing a method of producing a 213 nm beam using a Nd:YAG laser.

An eighth preferred embodiment is shown in FIG. 11. Q-switched, diode pumped Nd:YAG laser oscillator 100 is used to generate laser pulses at 1064 nm having a pulse energy of 100 millijoules and a pulse rate of 1000 pulses per second. This laser output is converted to pulses at a wavelength of 213 nm (the fifth harmonic of at the 1064 nm primary laser beam) by the established process of harmonic generation in non-linear crystal 103 as shown FIG. 12. Laser radiation at wavelengths of 532 nm and 355 nm is generated from 1064 nm with LBO crystals as described above with reference to FIG. 4. The input laser beam consists of p-polarized pulses at 1064 nm and 355 nm and s-polarized pulses at 532 nm. The beam passes through polarization retardation waveplate 109 designed to rotate the 355 nm polarization from p to s while leaving the 532 nm portion of the beam in the s-polarization state. The 1064 nm portion will be elliptical polarized but is not used in the process. The 532 m and the 355 nm pulses are mixed in the non-linear BBO crystal 110 which is oriented for Type I phase matching to result in laser pulses at 213 nm having p-polarization and an energy of approximately 10 millijoules at 1000 pulses per second.

Referring to FIG. 11, a second source 102 provides laser output at a wavelength of 2090 nm. This is a diode-pumped holmium Ho:YAG laser such as that described by Esterowitz in U.S. Pat. No. 5,038,353 (which is hereby incorporated herein by reference). This laser is q-switched to provide a pulsed output of approximately 1 millijoule per pulse at 1000 pulses per second. The p-polarized laser pulses at 213 nm and 2090 nm are combined at the dichroic mirror 104 to overlap in space and time. Temporal synchronization is achieved by electronic control of the trigger pulses applied to the primary laser q-switches using electronic timing control unit 101. These pulses enter the wavelength mixing crystal 105 which is a LBO crystal of about 20 mm in length oriented for Type I phase matching. The resulting laser pulses at the shorter sum-frequency wavelength of 193 nm have an energy of about 10 millijoules and a pulse rate of 1000 pulses per second.

While the above description contains many specificities, the reader should not construe these as limitations on the scope of the invention, but merely as exemplifications of preferred embodiments thereof. Those skilled in the art will envision many other possible variations which are within its scope.

For example, an alternative method of generating narrow line width, pulsed seed laser radiation, such as the self-seeding oscillator technique used by Hackel and co-workers, could be used. These workers have used the phenomenon of Stimulated Brillouin Scattering as a means reflect the laser beam, in place of mirror 41 in FIG. 3. This has the advantage of correcting thermally-induced phase aberrations at high laser power, when diffraction-limited performance is required. Other embodiments include configuration of the amplifier as a two-pass system, or in a ring geometry. In addition, other solid-state laser crystals could be used, such as Nd:YLF and Nd:GSGG.

Additional methods of wavelength conversion include the use of other non-linear optical crystals for harmonic generation and wavelength mixing. Examples of these crystals are Potassium Titanyl Phosphate, Potassium Dihydrogen Phosphate, Cesium-Lithium Borate, and others. In some embodiments, polarization rotation optics such as half-wave plates may be required to provide the correct polarization orientations for harmonic generation and wavelength mixing.

The pulse parameters of course can be varied; however, a pulse repetition rate of at least 500 pulses per second is recommended and the pulse duration should not be greater than about 30 nanoseconds. The linewidth of the Nd:YAG laser pulse should be controlled to less than 0.002 nm and preferably should be less than 0.001 nm. Additionally, the linewidth of the titanium:sapphire laser may be narrowed by injection-seeding rather than by the use of an etalon.

Accordingly, the reader is requested to determine the scope of the invention by the appended claims and their legal equivalents, and not by the given examples.

What is claimed is:

1. A system for generating substantially monochromatic ultraviolet laser radiation at a wavelength of approximately 193 nm, comprising:
    A) a Nd:YAG laser producing a primary laser beam comprising pulses of laser radiation at a wavelength of approximately 1064 nm,
    B) at least one first frequency multiplication crystal shaped and arranged to generate radiation at a wavelength of approximately 532 nm from said approximately 1064 nm laser radiation,
    C) at least one second frequency multiplication crystal shaped and arranged to generate radiation at a wavelength of approximately 355 nm utilizing said approximately 1064 nm laser radiation, and
    D) optical processing system receiving said radiation generated by said first frequency multiplication crystal and said radiation generated by said second frequency multiplication crystal and outputting an output beam having radiation at a wavelength of approximately 193 nm.

2. A system as in claim 1 wherein said at least one first frequency multiplication crystal comprises a LBO crystal.

3. A system as in claim 1 wherein said at least one second frequency mixing crystal comprises a LBO crystal.

4. A system as in claim 1 wherein said at least one second frequency mixing crystal comprises a BBO crystal.

5. A system as in claim 1 wherein said optical processing system comprises a tunable laser.

6. The system of claim 5 wherein said tunable laser comprises a titanium:sapphire laser.

7. The system of claim 5 wherein said tunable laser receives said approximately 532 nm radiation and generates an output beam having a wavelength of approximately 710 nm.

8. The system of claim 7 wherein said optical processing system further comprises:
    a first frequency mixing crystal receiving a portion of said approximately 1064 nm laser radiation and said approximately 355 nm radiation and outputting an output beam having radiation at a wavelength of approximately 266 nm; and
    a second frequency mixing crystal receiving said radiation at a wavelength of approximately 266 nm and said radiation at a wavelength of approximately 710 nm and outputting an output beam having radiation at a wavelength of approximately 193 nm.

9. The system of claim 5 wherein said tunable laser receives said approximately 532 nm radiation and generates an output beam having a wavelength of approximately 846 nm.

10. The system of claim 9 wherein said optical processing system further comprises at least one third frequency multiplication crystal shaped and arranged to generate radiation at a wavelength of approximately 423 nm utilizing said approximately 846 nm radiation.

11. The system of claim 10 wherein said optical processing system further comprises at least one frequency mixing crystal receiving said approximately 423 nm radiation and said approximately 355 nm radiation and outputting an output beam having radiation at a wavelength of approximately 193 nm.

12. The system of claim 5 wherein said tunable laser receives said approximately 532 nm radiation and generates an output beam having a wavelength of approximately 710 nm.

13. A system as in claim 1 wherein said optical processing system comprises a dichroic mirror and a BBO crystal.

14. A system as in claim 1 wherein said output beam from said optical processing means comprises radiation at a wavelength of approximately 193 nm.

15. The system of claim 1 wherein said primary laser beam produced by said Nd:YAG comprises narrow-linewidth pulses of laser radiation at a wavelength of approximately 1064 nm, said pulses having a duration of less than 30 nanoseconds and a repetition rate of at least 500 pulses per second and a linewidth of less than 0.0002 nanometers.

16. The system of claim 1 wherein said optical processing system is a solid state optical system.

17. The system of claim 1 wherein said optical processing system comprises a frequency mixing crystal receiving a portion of said approximately 1064 nm laser radiation and said approximately 355 nm radiation and outputting an output beam having radiation at a wavelength of approximately 266 nm.

18. A system for generating with a Nd:YAG laser highly monochromatic ultraviolet laser radiation, comprising:
  A) at least one Nd:YAG laser producing a primary laser beam comprising narrow-linewidth pulses of p polarized infra-red laser pulses of radiation at a wavelength of approximately 1064 nm,
  B) a type I LBO crystal shaped and arranged to double the frequency of a portion of said 1064 nm beam to produce a first combined beam comprising p polarized radiation at 1064 nm and s polarized 532 nm radiation,
  C) a type II LBO crystal shaped and arranged to convert said combined beam to a second combined beam comprising p polarized radiation at 1064 nm, s polarized nm radiation and p polarized 355 nm radiation, and
  D) optical processing system receiving said radiation generated by said type I LBO crystal and said radiation generated by said type II LBO crystal and generating a an output beam with a wavelength of approximately 193 nm.

19. A system as in claim 18 wherein said output beam from said optical processing means comprises ultraviolet radiation at approximately 193 nm.

20. A system for generating with a Nd:YAG laser substantially monochromatic ultraviolet laser radiation comprising:
  A) a laser source producing a primary laser beam comprising pulses of laser radiation at a wavelength of approximately 1064 nm,
  B) a first crystal shaped and arranged to double the frequency of a portion of said 1064 nm beam to produce a first combined beam comprising radiation at 1064 nm and 532 nm,
  C) a second crystal shaped and arranged to convert said first combined beam to a second combined beam comprising radiation at 1064 nm, 532 nm and 355 nm, and
  D) optical processing system receiving said second combined beam and outputting and output beam having a wavelength suitable for generating patterns on a semiconductor waver substrate.

21. A system as in claim 20 wherein said output beam from said optical processing means comprises radiation at a wavelength of approximately 248 nm.

22. The system of claim 20 wherein said optical processing system comprises a tunable laser.

23. The system of claim 22 wherein said tunable laser is a titanium:sapphire laser.

24. The system of claim 22 wherein said tunable laser receives said approximately 532 nm radiation in said second combined beam and generates a tunble laser output beam having a wavelength of in the range of approximately 710 nm and approximately 846 nm.

25. The system of claim 22 wherein said optical processing system further comprises:
  a frequency mixing crystal system receiving second combined beam and said tunable laser output beam and generating said output beam of said optical processing system using said tunable laser output beam and said 355 nm radiation in said second combined beam.

26. The system of claim 25 wherein said frequency mixing crystal system further comprises:
  a first frequency mixing crystal generating radiation having a wavelength of approximately 266 nm using said approximately 1064 nm radiation and said 355 nm radiation; and
  a second frequency mixing crystal generating radiation having a wavelength of approximately 193 nm using said output beam from said tunable laser and said approximately 266 nm radiation from said first frequency mixing crystal.

27. The system of claim 25 wherein said frequency mixing crystal system further comprises:
  a first frequency mixing crystal generating radiation having a wavelength of approximately 423 nm using said output beam from said tunable laser; and
  a second frequency mixing crystal generating radiation having a wavelength of approximately 193 nm using said approximately 423 nm radiation from said first frequency mixing crystal and said 355 nm radiation from said second combined beam.

28. The system of claim 20 wherein said laser source comprises a Nd:YAG laser.

29. A system for generating substantially monochromatic ultraviolet laser radiation at a wavelength of approximate 193 nm, comprising:
  a first laser source providing a first primary laser beam comprising pulses of laser radiation at a wavelength of approximately 1064 nm;
  at least one first frequency multiplication crystal shaped and arranged to generate radiation at a wavelength of approximately 532 nm from said approximately 1064 nm laser radiation in said first primary laser beam;
  a second laser source providing a second primary laser beam comprising pulses of laser radiation at a wavelength of approximately 1064 nm;
  at least one second frequency multiplication crystal shaped and arranged to generate radiation at a wavelength of approximately 355 nm from said approximately 1064 nm laser radiation in said one of the first or the second primary laser beam; and
  optical processing system receiving said radiation generated by said first frequency multiplication crystal and said radiation generated by said second frequency multiplication crystal and outputting an output beam having radiation at a wavelength of approximately 193 nm.

30. The system of claim 29 wherein said second frequency multiplication crystal generates said approximately 355 nm radiation from said second primary laser beam.

31. The system of claim 30 wherein said optical processing system comprises a tunable laser.

32. The system of claim 31 wherein said tunable laser comprises a titanium:sapphire laser.

33. The system of claim 31 wherein said tunable laser receives said approximately 532 nm radiation and generates an output beam having a wavelength of approximately 710 nm.

34. The system of claim 33 wherein said optical processing system further comprises:
  a first frequency mixing crystal receiving a portion of said approximately 1064 nm laser radiation from said second laser source and said approximately 355 nm radiation from said second frequency multiplication crystal and outputting an output beam having radiation at a wavelength of approximately 266 nm; and a second frequency mixing crystal receiving said radiation at a wavelength of approximately 266 nm and said radiation at a wavelength of approximately 710 nm and outputting an output beam having radiation at a wavelength of approximately 193 nm.

35. The system of claim 31 wherein said tunable laser receives said approximately 532 nm radiation and generates an output beam having a wavelength of approximately 846 nm.

36. The system of claim 35 wherein said optical processing system further comprises at least one third frequency multiplication crystal shaped and arranged to generate radiation at a wavelength of approximately 423 nm utilizing said approximately 846 nm radiation.

37. The system of claim 36 wherein said optical processing system further comprises at least one frequency mixing crystal receiving said approximately 423 nm radiation and said approximately 355 nm radiation and outputting an output beam having radiation at a wavelength of approximately 193 nm.

38. The system of claim 29 wherein said optical processing system comprises a frequency mixing crystal receiving a portion of said approximately 1064 nm laser radiation from said second laser source and said approximately 355 nm radiation and outputting an output beam having radiation at a wavelength of approximately 266 nm.

39. A system for generating substantially monochromatic ultraviolet laser radiation at a wavelength of approximately 193 nm, comprising:

a first laser source providing a first primary laser beam comprising pulses of laser radiation at a first wavelength;

a harmonic generator receiving said first primary laser beam and outputting an intermediate beam;

a second laser source providing a second primary laser beam comprising pulses of laser radiation at a wavelength that is different from the wavelength of said first primary laser beam;

a first frequency mixing crystal receiving said intermediate beam from said harmonic generator and second primary laser beam and outputting an output beam having radiation at a wavelength of approximately 193 nm.

40. The system of claim 39 wherein said second primary laser beam has a wavelength of approximately 2090 nm.

41. The system of claim 39 wherein said first laser source is a Nd:YAG laser and second laser source is a Ho:Yag laser.

42. The system of claim 39 wherein said first primary laser beam has a wavelength of approximately 1064 nm.

43. The system of claim 42 wherein said harmonic generator comprises:

at least one first frequency multiplication crystal shaped and arranged to generate radiation at a wavelength of approximately 532 nm from said approximately 1064 nm laser radiation in said first primary laser beam; and at least one second frequency multiplication crystal shaped and arranged to generate radiation at a wavelength of approximately 355 nm from said approximately 1064 nm laser radiation in said first primary laser beam.

44. The system of claim 43, said harmonic generator further comprising a second frequency mixing crystal receiving said approximately 355 nm radiation and said approximately 532 nm radiation and outputting said intermediate beam at a wavelength of approximately 213 nm.

45. The system of claim 44 wherein said second primary laser beam has a wavelength of approximately 2090 nm.

46. A system as in claim 44 wherein said second laser source comprises a Ho:YAG laser.

47. A system for generating substantially monochromatic ultraviolet laser radiation at a wavelength of approximately 193 nm, comprising:

a first laser source providing a first primary laser beam comprising pulses of laser radiation at a first wavelength;

a second laser source providing a second primary laser beam comprising pulses of laser radiation at a wavelength that is different from the wavelength of said first primary laser beam;

at least one frequency multiplication crystal shaped and arranged to generate radiation at a wavelength of approximately 355 nm from said first primary laser beam;

a frequency mixing crystal receiving said approximately 355 nm radiation and said second primary laser beam and outputting an output beam having radiation at a wavelength of approximately 248 nm.

48. The system of claim 47 wherein said second primary laser beam has a wavelength of approximately 828 nm.

49. The system of claim 47 wherein said second laser source includes a Cr:Li:SAF laser.

50. The system of claim 47 wherein said first laser source is a Nd:YAG laser and said first primary laser beam has a wavelength of approximately 1064 nm.

51. A system as in claim 47 wherein said second laser source includes a Cr:Li:SAF laser generating laser radiation at about 828 nm wherein said at least one mixing crystal generates 248 nm radiation from a combination of 355 nm radiation and said 828 nm radiation.

* * * * *